US012587953B2

(12) United States Patent
Kweon

(10) Patent No.: US 12,587,953 B2
(45) Date of Patent: Mar. 24, 2026

(54) COMMUNICATION METHOD AND DEVICE USING UPF EVENT EXPOSURE SERVICE FOR CHARGING SERVICE IN WIRELESS COMMUNICATION SYSTEM

(71) Applicant: SAMSUNG ELECTRONICS CO., LTD., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 18/160,883

(22) Filed: Jan. 27, 2023

(65) Prior Publication Data

US 2023/0247537 A1 Aug. 3, 2023

(30) Foreign Application Priority Data

Jan. 28, 2022 (KR) ........................ 10-2022-0013759
Jan. 18, 2023 (KR) ........................ 10-2023-0007334

(51) Int. Cl.
*H04W 48/16* (2009.01)
*H04M 15/00* (2024.01)
*H04W 24/10* (2009.01)

(52) U.S. Cl.
CPC ........... *H04W 48/16* (2013.01); *H04M 15/66* (2013.01); *H04W 24/10* (2013.01)

(58) Field of Classification Search
CPC .... H04W 4/24; H04W 4/0421; H04W 84/042
USPC ..................................... 370/329; 379/114.01
See application file for complete search history.

(56) References Cited

U.S. PATENT DOCUMENTS

| 9,582,816 | B2 * | 2/2017 | Peebles | ................. | H04M 15/83 |
| 10,075,303 | B2 * | 9/2018 | Li | ........................ | H04L 12/1407 |
| 10,778,589 | B2 * | 9/2020 | Arora | .................... | H04M 15/66 |
| 11,470,006 | B2 * | 10/2022 | Arora | .................... | H04M 15/66 |

(Continued)

FOREIGN PATENT DOCUMENTS

| CN | 102421080 A | * | 4/2012 | ......... | H04L 12/1407 |
| CN | 102421106 A | * | 4/2012 | ............ | H04M 15/66 |

(Continued)

OTHER PUBLICATIONS

"IEEE Draft Standard for Licensed/Unlicensed Spectrum Interoperability in Wireless Mobile Networks," in IEEE P1932.1/Dv0.5, Jul. 2023 , vol., No., pp. 1-84, Aug. 21, 2023. (Year: 2023).*

(Continued)

*Primary Examiner* — William D Cumming

(57) ABSTRACT

A method performed by a UPF for processing sponsored data in a wireless communication system is provided. The method comprises receiving, from a NEF, a subscription request message for subscribing to a UPF event exposure service based on the NEF receiving a charging generation request from an AF providing a sponsored data service, performing, based on information included in the subscription request message, a sponsored charging monitoring operation on the sponsored data provided to a UE from the AF, and transmitting, based on the sponsored charging monitoring operation, a usage report message to a CHF for the sponsored data, the CHF being in charge of charging processing.

10 Claims, 4 Drawing Sheets

(56) References Cited

U.S. PATENT DOCUMENTS

| | | | | |
|---|---|---|---|---|
| 11,765,200 B2 * | 9/2023 | Campo Trapero | ...... | H04L 63/20 |
| | | | | 726/24 |
| 12,294,931 B2 * | 5/2025 | Kim | ........................ | H04L 45/64 |
| 2005/0271193 A1 * | 12/2005 | Koskinen | ............ | H04L 12/1471 |
| | | | | 379/114.01 |
| 2015/0242903 A1 * | 8/2015 | Peebles | .............. | G06Q 30/0273 |
| | | | | 705/14.64 |
| 2018/0006954 A1 * | 1/2018 | Arora | .................. | H04L 41/0894 |
| 2020/0412653 A1 * | 12/2020 | Arora | .................. | H04W 84/042 |
| 2021/0258872 A1 | 8/2021 | Mihály et al. | | |
| 2022/0345929 A1 * | 10/2022 | Lee | ........................ | H04M 15/66 |
| 2023/0247537 A1 * | 8/2023 | Kweon | .............. | H04L 12/1403 |
| | | | | 370/329 |
| 2023/0362784 A1 * | 11/2023 | Kim | ...................... | H04W 28/12 |
| 2025/0310906 A1 * | 10/2025 | Wu | ..................... | H04L 12/1407 |

FOREIGN PATENT DOCUMENTS

| | | | | | | |
|---|---|---|---|---|---|---|
| CN | 106817687 A | * | 6/2017 | .............. | H04W 4/24 |
| CN | 107103486 B | * | 1/2021 | .............. | H04W 4/24 |
| KR | 20230116694 A | * | 8/2023 | ........ | H04L 12/1403 |
| WO | WO-2016078418 A1 | * | 5/2016 | .............. | H04W 4/24 |
| WO | WO-2018006079 A1 | * | 1/2018 | ............ | H04M 15/31 |
| WO | 2020224791 A1 | | 11/2020 | | |
| WO | 2021095655 A1 | | 5/2021 | | |
| WO | 2021156771 A1 | | 8/2021 | | |
| WO | WO-2023146335 A1 | * | 8/2023 | ............ | H04M 15/09 |

OTHER PUBLICATIONS

International Search Report and Written Opinion of the International Searching Authority dated Apr. 20, 2023, in connection with International Application No. PCT/KR2023/001256, 8 pages.

Samsung, "Procedure for low latency exposure of QoS monitoring via NEF", 3GPP TSG-SA WG2 Meeting #145E S2-2104710, May 2021, Electronic, Elbonia, 4 pages.

3GPP TS 23.502 V17.3.0 (Dec. 2021) Technical Specification; 3rd Generation Partnership Project; Technical Specification Group Services and System Aspects; Procedures for the 5G System (5GS); Stage 2 (Release 17); 727 pages.

3GPP TR 28.822 V1.0.0 (Dec. 2021) Technical Specification; 3rd Generation Partnership Project; Technical Specification Group Services and System Aspects Charging management Study on charging aspect of 5G LAN-type services; (Release 17); 27 pages.

Supplementary European Search Report dated Feb. 10, 2025, in connection with European Patent Application No. 23747376.4, 19 pages.

* cited by examiner

COMMUNICATION METHOD AND DEVICE USING UPF EVENT EXPOSURE SERVICE FOR CHARGING SERVICE IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0013759 filed on Jan. 28, 2022, and Korean Patent Application No. 10-2023-0007334 filed on Jan. 18, 2023, in the Korean Intellectual Property Office, the disclosures of which are herein incorporated by reference in their entirety.

BACKGROUND

1. Field

The disclosure relates to a communication method and device for a charging service in a wireless communication system.

2. Description of Related Art 5G mobile communication technology defines a wide frequency band to enable fast transmission speed and new services and may be implemented in frequencies below 6 GHz ("sub 6 GHz"), such as 3.5 GHz, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by ¹⁄₁₀.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

SUMMARY

The disclosure provides a communication method and device using a UPF event exposure service for a charging service in a wireless communication system.

The disclosure also provides a communication method and device for subscribing to a UPF event exposure service for a charging service in a wireless communication system.

The disclosure also provides a method and device for providing a sponsored charging service using a UPF event exposure service in a wireless communication system.

The disclosure also provides a method and device for discovering a UPF supporting a UPF event exposure service in a wireless communication system.

According to an embodiment of the disclosure, a method performed by a user plane function (UPF) configured to process sponsored data in a wireless communication system configured to support a sponsored data service comprises receiving a subscription request message for subscribing to a UPF event exposure service from a network exposure function (NEF) receiving a charging generation request from an application function (AF) configured to provide the sponsored data service, performing sponsored charging monitoring on the sponsored data provided from the AF to a user equipment (UE) based on information included in the subscription request message, and transmitting a usage report message for the sponsored data to a charging function (CHF) in charge of charging processing, based on the sponsored charging monitoring.

According to an embodiment of the disclosure, a user plane function (UPF) configured to process sponsored data in a wireless communication system configured to support a sponsored data service comprises a transceiver and a processor configured to receive, through the transceiver, a subscription request message for subscribing to a UPF event exposure service from a network exposure function (NEF) receiving a charging generation request from an application function (AF) configured to provide the sponsored data service, perform sponsored charging monitoring on the sponsored data provided from the AF to a user equipment (UE) based on information included in the subscription request message, and transmit, through the transceiver, a usage report message for the sponsored data to a charging function (CHF) in charge of charging processing, based on the sponsored charging monitoring.

According to an embodiment of the disclosure, a method performed by a network entity in a wireless communication system comprises transmitting, to a network repository function (NRF), a discovery request message for discovering a UPF configured to support a UPF event exposure service and receiving a discovery response message including information about the UPF configured to support the UPF event exposure service in response to transmission of the discovery request message.

According to an embodiment of the disclosure, a network entity in a wireless communication system comprises a transceiver and a processor configured to transmit, through the transceiver to a network repository function (NRF), a discovery request message for discovering a UPF configured to support a UPF event exposure service and receive, through the transceiver, a discovery response message including information about the UPF configured to support the UPF event exposure service in response to transmission of the discovery request message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
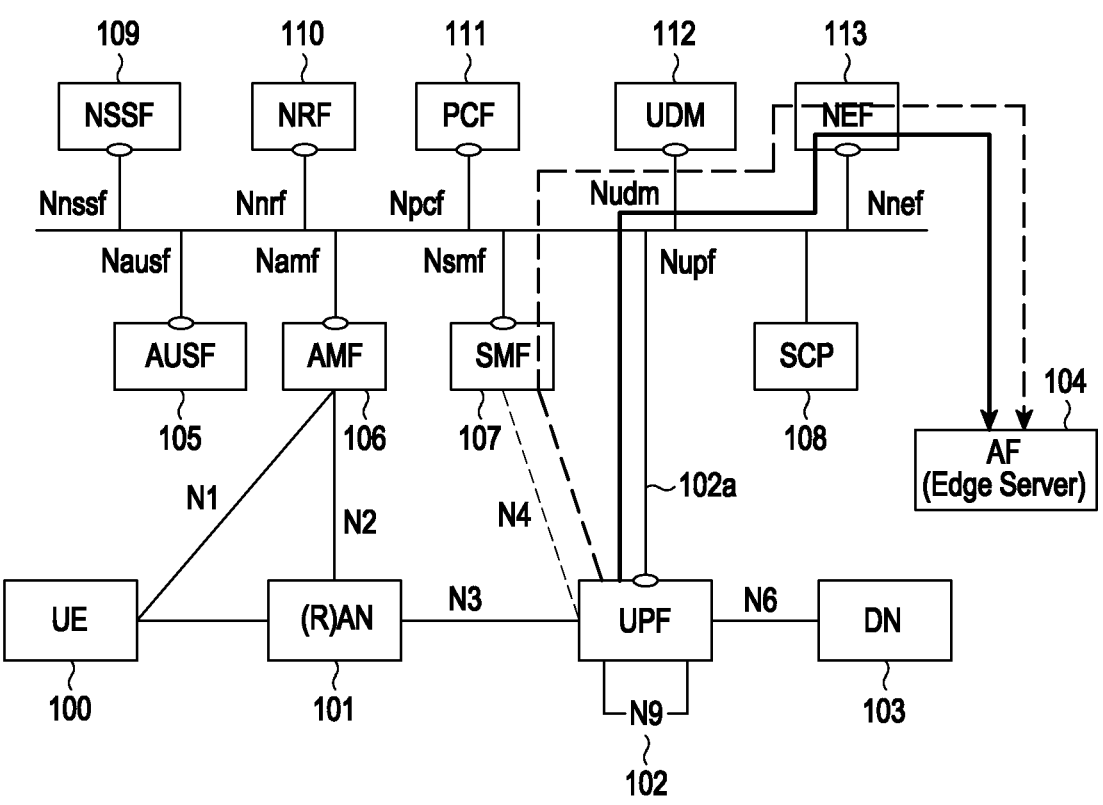
FIG. 1 illustrates an example configuration of a wireless communication system according to an embodiment of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term " . . . unit" means a software element or a hardware element. The " . . . unit" plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub-units. Further, an element or a 'unit' may be implemented to reproduce one or more CPUs in a device or a security multimedia card. According to embodiments, a " . . . unit" may include one or more processors.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

In the disclosure, the user equipment (UE) may refer to a terminal, MS (mobile station), cellular phone, smartphone, computer, or various electronic devices capable of performing communication functions. According to the disclosure, the base station may be an entity allocating a resource to the UE and may be at least one of a gNode B, gNB, eNode B, eNB, Node B, BS, radio access network (RAN), base station controller, or node on network.

The embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

In a specific description of the disclosure, a communication system may use various wired or wireless communication systems, e.g., the new RAN (NR), which is the radio access network, and the packet core (5G system, or 5G core network, or next generation core (NG core)), which is the core network, according to the 5G communication standard of the 3GPP which is a radio communication standardization organization. Embodiments of the disclosure may also be applicable to communication systems with a similar technical background with minor changes without significantly departing from the scope of the disclosure, and this may be possible under the determination of those skilled in the art to which the disclosure pertains.

As used herein, terms for identifying access nodes, terms denoting network entities (NEs), terms denoting messages, terms denoting interfaces between network functions (NFs), and terms denoting various pieces of identification information are provided as an example for ease of description. Thus, the disclosure is not limited by the terms, and such terms may be replaced with other terms denoting objects with equivalent technical concept.

The 5G system may support the network slice, and traffic for different network slices may be processed by different protocol data unit (PDU) sessions. The PDU session may mean an association between a data network providing a PDU connection service and a UE. The network slice may be understood as technology for logically configuring a network with a set of network functions (NF) to support various services with different characteristics, such as broadband communication services, massive IoT, V2X, or other mission critical services, and separating different network slices. Therefore, even when a communication failure occurs in one network slice, communication in other network slices is not affected, so that it is possible to provide a stable communication service. In the disclosure, the term "slice" may be interchangeably used interchangeably with "network slice." In such a network environment, the UE may access a plurality of network slices when receiving various services. Further, the network function (NF) may be a software instance running on hardware and be implemented as a virtualized function instantiated on a network element or an appropriate platform.

The mobile communication provider may constitute the network slice and may allocate network resources suitable for a specific service for each network slice or for each set of network slices. A network resource may mean an network function (NF) or logical resource provided by the NF or radio resource allocation of a base station.

For example, a mobile communication provider may configure network slice A for providing a mobile broadband service, network slice B for providing a vehicle communication service, and network slice C for providing a broadcast service. In other words, the 5G network may efficiently provide a corresponding service to a UE through a specialized network slice suited for the characteristics of each service. In the 5G system, the network slice may be represented as single-network slice selection assistance information (S-NSSAI). The S-NSSAI may include a slice/service type (SST) value and a slice differentiator (SD) value. The SST may indicate the characteristics of the service supported by the network slice (e.g., enhanced mobile broadband (eMBB), IoT, ultra-reliability low latency communication (URLLC), V2X, etc.). The SD may be a value used as an additional identifier for a specific service referred to as SST.

In the disclosure, the network technology may refer to the standards (e.g., TS 23.501, TS 23.502, TS 23.503, etc.) defined by the international telecommunication union (ITU) or 3GPP, and each of the components included in the network architecture of FIG. 1 may mean a physical entity or may mean software that performs an individual function or hardware combined with software. Reference characters denoted by Nx in the drawings, such as N1, N2, N3, . . . , etc., indicate known interfaces between NFs in the 5G core network (CN), and the relevant descriptions may be found in the standard specifications (TS 23.501). Therefore, a detailed description will be omitted.

FIG. 1 illustrates an example of a configuration of a wireless communication system supporting a sponsored charging service using a UPF event exposure service according to an embodiment of the present disclosure. FIG. 1 exemplifies a configuration of a 5G system.

The wireless communication system shown in FIG. 1 may include a radio access network (or referred to as NG-RAN) 101 and a 5G core network (5GC). The NG-RAN 101 may be a base station (e.g., gNB or integrated access and backhaul (IAB)) supporting radio access technology in the 5G system. The NG-RAN 101 may provide control information and/or data from the application function (AF) (or application server (AS)) 104 of an external network to the UE 100 through the core network (i.e., 5GC). Further, the NG-RAN 101 may provide the control information and/or data received from the UE 100 to the AF 104 through the 5GC. In FIG. 1, the 5GC may include network entities, such as an access and mobility management function (AMF) 106, a session management function (SMF) 107, a user plane function (UPF) 102, a policy control function (PCF) 111, a unified data management (UDM) 112, a network exposure function (NEF) 113, a network repository function (NRF) 110, an authentication server function (AUSF) 105, a service communication proxy (SCP) 108, and a network slice selection policy (NSSF) 109. Descriptions of entities not directly related to the disclosure among the network entities will be omitted for convenience.

The AMF 106 is an entity for managing access and mobility of the UE 100. The AMF 106 may serve as a UE-core network endpoint through which the UE 100 connects with other entity(s) of the 5GC through the NG-RAN 101. As an example, the AMF 106 may perform such functions as registration of the UE 100, connection, reachability, mobility management, access identification/authentication, and mobility event generation.

The SMF 107 may perform a management function for a protocol data unit (PDU) session of the UE 100. For example, the SMF 107 may perform such network functions as session management functions of establishing, modifying, or releasing a session and maintaining a tunnel between the UPF 102 and the NG-RAN 101 necessary therefor, the functions of allocating and managing an Internet protocol (IP) address of the UE 100, selection and control of the user plane, control of traffic processing on the UPF, and billing data gathering control.

The UPF 102 serves to process data of the UE 100 and may play a role to transfer the data transmitted from the UE 100 to the AF 104 or process the data to allow the data introduced from the AF 104 to be transferred to the UE 100. The UPF 102 may perform network functions, such as acting as an anchor between radio access technologies (RATs), providing connection with PDU sessions and the AF 104, packet routing and forwarding, packet inspection, application of user plane policy, creating a traffic usage report, or buffering.

Figure 3:
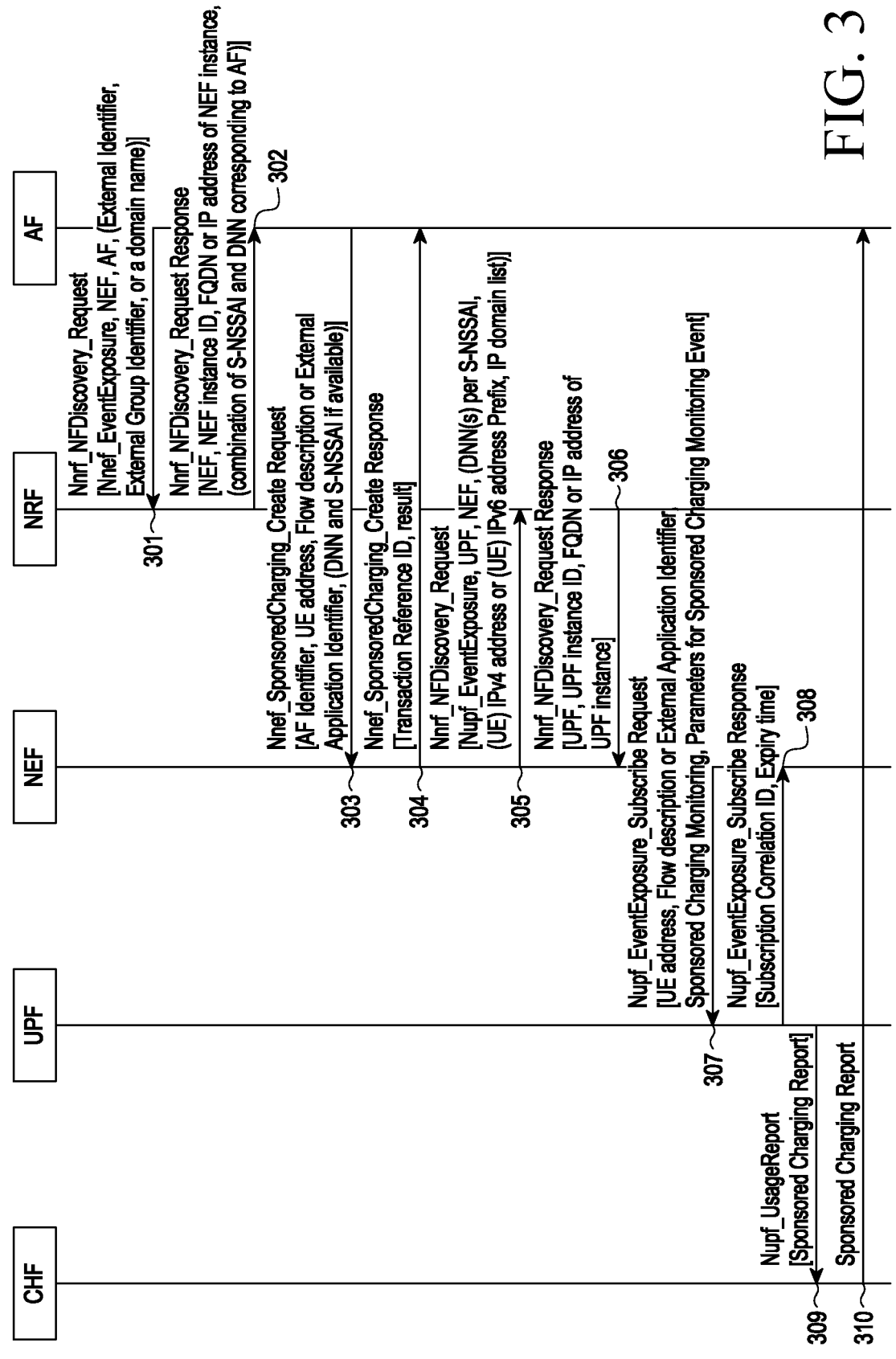
FIG. 3 illustrates a flowchart of a sponsored charging service method using a UPF event exposure service in a wireless communication system according to an embodiment of the present disclosure.

Further, FIG. 1 illustrates an example of the UPF using an Nupf service 102a. As shown in FIG. 3 described below, the UPF 102 processing user plane data may receive a request for subscribing to a UPF event exposure service related to a sponsored charging service from the NEF 113 through the Nupf service 102a and transmit a response to the subscription request according to an embodiment of the disclosure. According to the request for subscribing to the UPF event exposure service, the UPF 102 may perform sponsored charging monitoring related to the sponsored data provided from the AF 104 to the UE 100 through the UPF 102. Then, the UPF 102 may directly report to a charging function (CHF) (not shown) processing charging in the 5G system based on the monitoring result. Then, the CHF may transmit a sponsored charging report including charging information to the AF 104. In the conventional wireless communication system, the signaling of the control plane related to a charging service is directly transferred from the SMF to the CHF. However, in the disclosure, the UPF 102 may process the data of the control plane related to the sponsored charging service between the NEF 113 and the CHF.

The UDM 112 performs functions, such as generating authentication information for 3GPP security, processing the user ID, managing a list of network functions (NFs) supporting the UE, and managing subscription information. The PCF 111 is an NF that manages operator policy information for providing a service in the 5G system.

The NEF 113 may be responsible for transmitting or receiving an event occurring in the 5G system and a supported capability to/from the outside. For example, the NEF 113 may perform functions, such as safe supply of information about of the AF 104 to the 5GC, conversion of internal/external information, and redistribution of the information received from other NFs. The NRF 110 manages registration information about NFs in the 5G system. In the disclosure, as in the embodiment of FIG. 3 described below, upon receiving a charging generation request related to providing the sponsored data from the AF 104 providing the sponsored data to the UE 100, the NEF 113 may request the NRF 110 to discover the UPF 102 and send a UPF event exposure service subscription request to the discovered UPF 102.

The UE 100 may access the NG-RAN 101 and register in the 5G system. For example, the UE 100 may access the NG-RAN 101 to perform a UE registration procedure with the AMF 106. During the registration procedure, the AMF 106 may determine a network slice available to the UE accessing the NG-RAN 101 and allocate the network slice to the UE. The UE 100 may select a network slice and establish a PDU session for communication with the AF 104.

For a basic description of basic operations of the network entities and messages transmitted/received between the network entities in the embodiments of the disclosure, 3GPP NR standards (e.g., TS 23.501, TS 23.502, TS 23.503, etc.) may be referenced.

The wireless communication system of FIG. 1 may provide the following functions/services in relation to feasibility study_UPF enhancement for exposure and service-based architecture (SBA) (FS_UPEAS):

Integration of UPF 102 into 5GC SBA;

avoiding duplicate data transfer and reducing transmission path;

retrieving the original status or real-time service flow information from UPF 102; and/or UPF event exposure service.

A UPF event exposure service(s) according to an embodiment of the disclosure may support functions/services, such as a), b), and c) below:

a) Consumption of UPF exposure services by the PCF, network data analytics function (NWDAF), CHF, NEF, trusted AF and other NFs (if needed));

b) (To support the UPF exposure service, if needed) Use of SMF services, PCF services, NWDAF services, CHF services, NEF services, trusted AF services by the UPF) NOTE 1: This will not define solutions where UPF exposes information that the UPF is not an originator of, i.e., not re-expose information owned and exposed by other NFs); and c) Relevant event IDs.

Further, issues for supporting a UPF event exposure service(s) by the CHF according to an embodiment of the disclosure are related to at least one of A), B), and C) below:

A) Information required to support an online charging service and method for processing the information;

B) Information required to support an offline charging service and method for processing the information; and C) Information required to support a new charging service (e.g., the sponsored charging service according to the disclosure) and method for processing the information.

Figure 2:
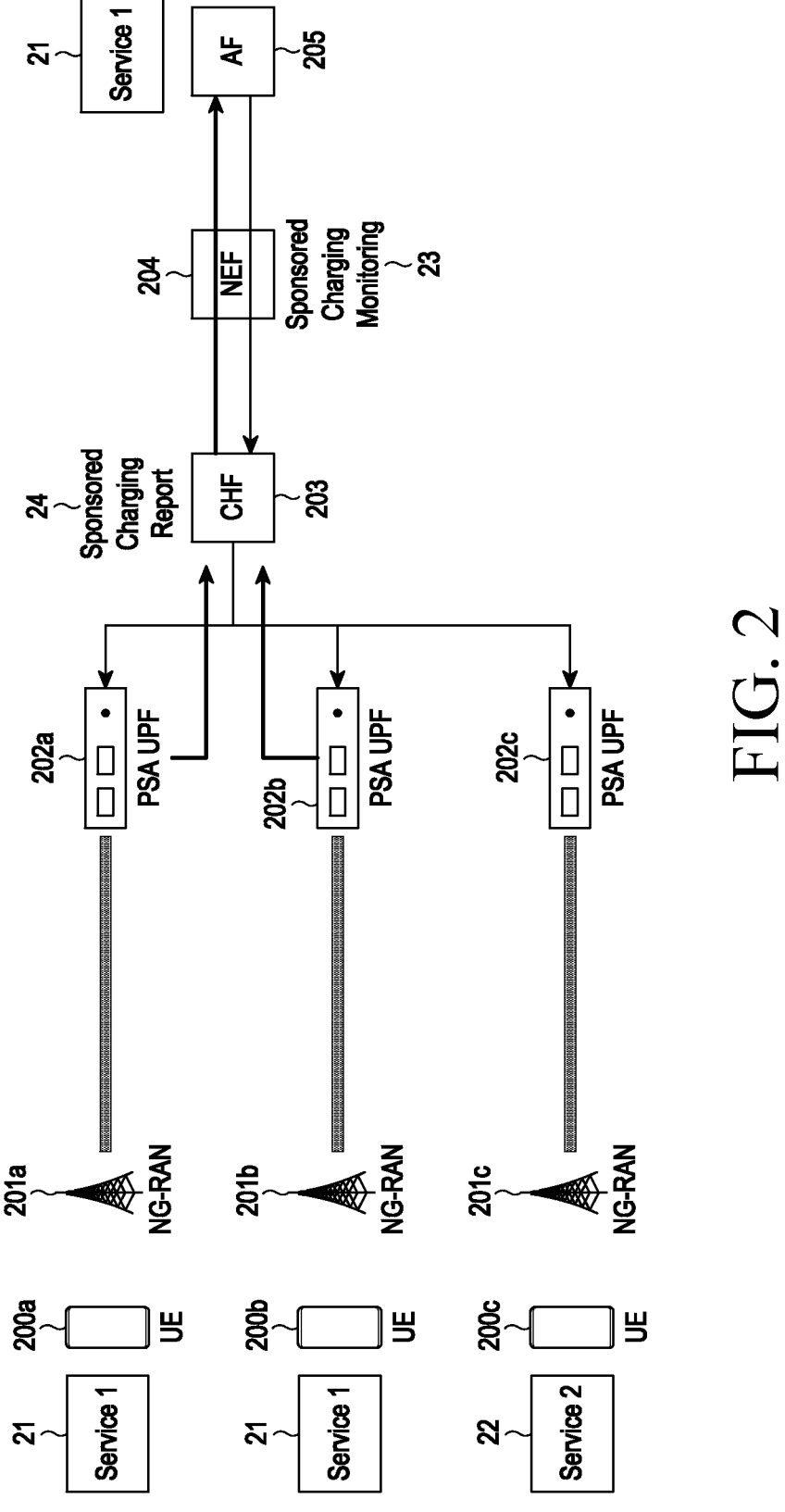
FIG. 2 illustrates an example of a sponsored charging service using a UPF event exposure service in a wireless communication system according to an embodiment of the present disclosure.

FIG. 2 illustrates an example of a sponsored charging service using a UPF event exposure service in a wireless communication system according to an embodiment of the present disclosure. The example of FIG. 2 assumes that in the context where among a plurality of UEs 200a, 200b, and 200c, UEs 200a and 200b receive data of service 1 21, and a UE 200c receives data of service 2 22, the data of service 1 21 is sponsored data provided from the AF 205 to the UEs 200a and 200b, and the data of service 2 22 is non-sponsored data provided from the AF 205 or another AF (not shown) to the UE 200c. In the example of FIG. 2, the data of service 1 21 is transferred from the AF 205 to the UEs 200a and 200b through UPFs 202a and 202b and NG-RANs 201a and 201b, and the data of service 2 22 is transferred from the AF 205 or another AF to the UEs 200a and 200b through the UPFs 202a and 202b and the NG-RANs 201a and 201b. The UPFs 202a, 202b, and 220c may function as corresponding PDU session anchors (i.e., PSA).

The sponsored charging service may include, e.g., a service in which when the user of the UE subscribes to a paid service (broadcast, movie, sports, music or other various multimedia services) provided by the AF, a charge on the wireless communication system, generated while providing service data to the UE through the wireless communication system in the paid service, is imposed on the service provider, i.e., the AF, rather than the user of the UE. In the example of FIG. 2, if the AF 205 sends a request for sponsored charging to the NEF 204 for a sponsored charging service, the NEF 204 discovers UPFs 202a and 202b processing the data of service 1 21 and sends a request for sponsored charging monitoring to the discovered UPFs 202a and 202b. The UPFs 202a and 202b may monitor information necessary for charging on the data traffic of service 1 21 and the time during which the data is served from the AF to the UE and directly report (i.e., Nupf_UsageReport) the monitoring result to the CHF which is the entity processing charging. Then, the CHF may transmit a sponsored charging report including charging information related to providing/using the data of service 1 21 to the AF 205.

Through the configuration of FIG. 2, sponsored charging traffic monitoring service subscription and sponsored charging traffic measurement/report transmission may be performed.

According to an embodiment of the disclosure, the Nupf_EventExposure service allows the NF to subscribe to the event ID and receive a notification, and in the Nupf_EventExposure_Subscribe service operation, at least one of information 1) and 2) below may be used:

1) UE address, flow description or external application identifier; and

2) Periodic measurement threshold, volume measurement threshold, time measurement threshold, event measurement threshold, measurement method.

Further, an example configuration of the Nupf_UsageReport transmitted to the CHF from the UPF supporting a sponsored charging service using a UPF event exposure service according to an embodiment of the disclosure is as shown in Table 1 below.

TABLE 1

| | |
|---|---|
| Start time | Provides the timestamp, in terms of absolute time, when the collection of the information provided within Usage-Information is started. |
| End time | Provides the timestamp, in terms of absolute time, when the information provided within Usage-Information is generated. |
| Measurement information | Defines the measured volume/time/events for this URR. |
| Other information | Other events/information, e.g., related to reporting of UE MAC addresses. |

FIG. 3 illustrates a sponsored charging service method using a UPF event exposure service in a wireless communication system according to an embodiment of the present disclosure. Since the description of the network entities in the example of FIG. 3 is the same as the description of corresponding network entities in the examples of FIGS. 1 and 2, a description of basic operations of each network entity will be omitted.

Referring to FIG. 3, according to the procedure of steps 301 to 310, the NEF, receiving a request for generating a sponsored charging service from the AF, may be a consumer using a UPF event exposure service. The NEF may request the NRF to discover a corresponding UPF processing sponsored data through a UPF event exposure service discovery procedure with the NRF. Further, the NEF may send a request for sponsored charging monitoring to the UPF through a procedure for subscribing to the discovered UPF event exposure service related to the sponsored charging service. Further, the UPF receiving the sponsored charging monitoring request may perform sponsored charging reporting to the charging function (CHF) based on the monitoring result.

Specifically, referring to FIG. 3, in step 301, the AF to use the sponsored charging service transmits a first discovery request message for discovering an NEF for requesting to generate a sponsored charging service, to the NRF. The first discovery request message may include information about the AF. In step 302, the AF may receive a first discovery response message including information about the discovered NEF from the NRF, in response to the first discovery request message. The first discovery response message may include at least one of identification information (e.g., NEF or NEF instance ID) about the NEF, network address information (fully qualified domain name (FQDN) or IP address) about the NEF, and S-NSSAI and DNN combined information corresponding to the AF.

In step 303, the NEF may receive a charging request message to request to generate a sponsored charging service from the AF identifying the NEF information. The charging request message may include at least one of the identifier of the AF, the identifier of the UE(s) receiving sponsored data from the AF, flow description related to the sponsored data service, application identifier related to the sponsored data service, and S-NSSAI and DNN combined information corresponding to the AF. In step 304, the NEF may include at least one of the transaction reference ID of the sponsored charging service and result information (e.g., accept/reject) about the charging request in response to the charging request message.

In step 305, the NEF transmits a second discovery request message to request the NRF to discover the UPF processing sponsored data, through a UPF event exposure service discovery procedure. The second discovery request message may include at least one of information (e.g., Nupf_EventExposure or UPF) indicating that the discovery request is related to the UPF event exposure service, information about the NEF, DNN(s) per S-NSSAI related to the sponsored data service provided to the UE through the AF, and the IP address of the UE. In step 306, the NEF may receive a second discovery response message including information about the discovered UPF from the NRF, in response to the second discovery request message. The second discovery response message may include at least one of identification information (e.g., UPF or UPF instance ID) about the UPF and network address information (FQDN or IP address) about the UPF.

Thereafter, in step 307, the UPF receives a subscription request message for subscribing to the UPF event exposure service from the NEF identifying the UPF through a UPF event exposure service discovery procedure. The subscription request message may include the UE address using the sponsored data service, flow description related to the sponsored data service, application identifier related to the sponsored data service, sponsored charging monitoring request, and parameters for the sponsored charging monitoring event. The parameters may include at least one of, e.g., the periodic measurement threshold used for sponsored charging monitoring, volume measurement threshold, time measurement threshold, event measurement threshold, and measurement method. In step 308, the UPF may transmit a subscription response message including at least one of the subscription correlation ID and expiration time given to the subscription to the UPF event exposure service to the NEF in response to the subscription request message received from the NEF. The UPF granting the subscription to the UPF event exposure service may perform sponsored charging monitoring on the sponsored data provided from the AF to the UE based on the information included in the subscription request message.

Thereafter, in step 309, the UPF may transmit a usage report message for the sponsored data provided from the AF to the UE, based on the sponsored charging monitoring. The usage report message (Nupf_UsageReport) may include at least one of the information exemplified in Table 1 above. Then, in step 310, the CHF may perform sponsored charging reporting to the AF using the sponsored charging service. The sponsored charging report may equally include the information contained in the Nupf_UsageReport or may include the charging information generated based on the information included in the Nupf_UsageReport. In other words, the CHF may perform sponsored charging reporting to the AF based on the Nupf_UsageReport as in the example of Table 1, received from the UPF.

Figure 4:
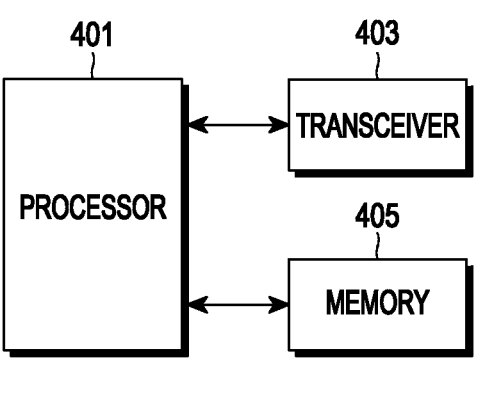
FIG. 4 illustrates an example of a configuration of a network entity in a wireless communication system according to an embodiment of the present disclosure.

FIG. 4 illustrates an example of a configuration of a network entity in a wireless communication system according to an embodiment of the present disclosure.

The network entity of FIG. 4 may be one of the UE, RAN or the network functions (NFs), such as the SMF, AMF, PCF, UDM, NRF, NEF, and AF, described above in connection with FIGS. 1 to 3.

According to an embodiment of the disclosure, the network entity may include a processor 401 controlling the overall operation of the network entity according to one or a combination of two or more of the embodiments of FIGS. 1 to 3, a transceiver 403 including a transmitter and a receiver, and a memory 405. Without limited thereto, the network entity may include more or less components than those shown in FIG. 4. When the network entity of FIG. 4 is a RAN, the network entity may include a transceiver for transmitting/receiving signals to/from the UE through the wireless network and a transceiver (or communication interface) for wiredly/wirelessly transmitting/receiving signals to/from the 5GC, as well as the processor 401 and the memory 405. According to an embodiment of the disclosure, the transceiver 403 may transmit/receive signals to/from at least one of other network entities or a UE. The signals transmitted/received with at least one of the other network entities or the UE may include at least one of control information and data.

In FIG. 4, the processor 401 may control the overall operation of the network entity to perform operations according to one or a combination of two or more of the embodiments of FIGS. 1 to 3 described above. The processor 401, the transceiver 403, and the memory 405 are not necessarily implemented in separate modules but rather as a single chip. The processor 401 and the transceiver 403 may be electrically connected with each other. The processor 401 may be an application processor (AP), a communication processor (CP), a circuit, an application-specific circuit, or at least one processor. The transceiver 403 may include a communication interface for wiredly/wirelessly transmitting/receiving signals to/from another network entity.

According to an embodiment of the disclosure, the memory 405 may store a default program for operating the network entity, application programs, and data, such as configuration information. The memory 905 provides the stored data according to a request of the processor 1201. The memory 405 may include a storage medium, such as ROM, RAM, hard disk, CD-ROM, and DVD, or a combination of storage media. There may be provided a plurality of memories 905. The processor 401 may perform at least one of the above-described embodiments based on a program for performing operations according to at least one of the above-described embodiments stored in the memory 405.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

It should be noted that the above-described configuration views, example views of control/data signal transmission methods, example views of operational procedures, and configuration views are not intended as limiting the scope of the disclosure. In other words, all the components, network entities, or operational steps described in connection with the embodiments should not be construed as essential components to practice the disclosure, and the disclosure may be rather implemented with only some of the components without departing from the gist of the disclosure. The embodiments may be practiced in combination, as necessary. For example, some of the methods provided herein may be combined to operate the network entity and the UE.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user plane function (UPF) for processing sponsored data in a wireless communication system, the method comprising:

receiving, from a network exposure function (NEF), a subscription request message for subscribing to a UPF event exposure service, based on the NEF receiving a charging generation request from an application function (AF) providing a sponsored data service;

performing, based on information included in the subscription request message, a sponsored charging monitoring operation on the sponsored data provided to a user equipment (UE) from the AF; and transmitting, based on the sponsored charging monitoring operation, a usage report message to a charging function (CHF) for the sponsored data, the CHF being in charge of charging processing.

2. The method of claim 1, wherein the subscription request message includes at least one of address information for the UE, an application identifier (ID) related to the sponsored data service, a sponsored charging monitoring request, and parameters for a sponsored charging monitoring event.

3. The method of claim 2, wherein the parameters include at least one of a periodic measurement threshold, a volume measurement threshold, a time measurement threshold, an event measurement threshold, and a measurement method used in the sponsored charging monitoring operation.

4. The method of claim 1, wherein the usage report message includes at least one of traffic of the sponsored data, and a start time and end time when the sponsored data service is provided to the UE.

5. The method of claim 1, further comprising transmitting, to the NEF, a subscription response message including a subscription correlation identifier (ID) given for a subscription to the UPF event exposure service in response to receiving the subscription request message.

6. A user plane function (UPF) for processing sponsored data in a wireless communication system, the UPF comprising:

a transceiver; and a processor operably coupled to the transceiver, the processor configured to:

receive, from a network exposure function (NEF), a subscription request message for subscribing to a UPF event exposure service, based on the NEF receiving a charging generation request from an application function (AF) providing a sponsored data service, perform, based on information included in the subscription request message, a sponsored charging monitoring operation on the sponsored data provided to a user equipment (UE) from the AF, and transmit, based on the sponsored charging monitoring operation, a usage report message to a charging function (CHF) for the sponsored data, the CHF being in charge of charging processing.

7. The UPF of claim 6, wherein the subscription request message includes at least one of address information for the UE, an application identifier (ID) related to the sponsored data service, a sponsored charging monitoring request and parameters for a sponsored charging monitoring event.

8. The UPF of claim 7, wherein the parameters include at least one of a periodic measurement threshold, a volume measurement threshold, a time measurement threshold, an event measurement threshold, and a measurement method used in the sponsored charging monitoring operation.

9. The UPF of claim 6, wherein the usage report message includes at least one of traffic of the sponsored data, and a start time and end time when the sponsored data service is provided to the UE.

10. The UPF of claim 6, wherein the processor is further configured to transmit, to the NEF, a subscription response message including a subscription correlation identifier (ID) given for a subscription to the UPF event exposure service in response to receiving the subscription request message.

* * * * *